United States Patent
Sakai et al.

(10) Patent No.: US 11,789,489 B2
(45) Date of Patent: Oct. 17, 2023

(54) VIBRATION SYSTEM, SPEAKER APPARATUS AND VIDEO DISPLAYING APPARATUS

(71) Applicant: SONY CORPORATION, Tokyo (JP)

(72) Inventors: Haruka Sakai, Tokyo (JP); Takahisa Tagami, Kanagawa (JP); Emiko Ikeda, Tokyo (JP); Naoya Kunikata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 687 days.

(21) Appl. No.: 16/760,231

(22) PCT Filed: Oct. 22, 2018

(86) PCT No.: PCT/JP2018/039133
§ 371 (c)(1),
(2) Date: Apr. 29, 2020

(87) PCT Pub. No.: WO2019/111558
PCT Pub. Date: Jun. 13, 2019

(65) Prior Publication Data
US 2020/0356138 A1    Nov. 12, 2020

(30) Foreign Application Priority Data

Dec. 7, 2017    (JP) .................................. 2017-234849

(51) Int. Cl.
*H04R 7/12*    (2006.01)
*G06F 1/16*    (2006.01)
(Continued)

(52) U.S. Cl.
CPC .............. *G06F 1/1605* (2013.01); *G06F 3/16* (2013.01); *G10K 9/13* (2013.01); *H04R 1/10* (2013.01);
(Continued)

(58) Field of Classification Search
CPC ... H04R 1/10; H04R 7/12; H04R 7/14; H04R 7/20; H04R 9/041; H04R 9/06;
(Continued)

(56) References Cited

U.S. PATENT DOCUMENTS

2005/0226456 A1* 10/2005 Tabata ...................... H04R 7/20
                                                                381/423
2008/0232633 A1*  9/2008 Corynen .................. H04R 7/14
                                                                381/396

FOREIGN PATENT DOCUMENTS

CN          101422049 A       4/2009
CN          102082986 A       6/2011
(Continued)

OTHER PUBLICATIONS

Office Action for CN Patent Application No. 201880071107.1, dated May 6, 2021, 8 pages of Office Action and 10 pages of English Translation.
(Continued)

*Primary Examiner* — Huyen D Le
(74) *Attorney, Agent, or Firm* — CHIP LAW GROUP

(57) ABSTRACT

A vibration system includes a vibration plate and an edge portion disposed around the vibration plate. The vibration plate has a first region and a second region that have shapes asymmetrical with each other. The vibration plate is configured such that a weight difference between the first region and the second region is equal to or smaller than a threshold value and besides stiffness at the edge portion is substantially uniform.

10 Claims, 10 Drawing Sheets

(51) Int. Cl.
  *G06F 3/16*   (2006.01)
  *G10K 9/13*   (2006.01)
  *H04R 1/10*   (2006.01)
  *H04R 7/20*   (2006.01)

(52) U.S. Cl.
  CPC .............. *H04R 7/12* (2013.01); *H04R 7/20* (2013.01); *H04R 2440/07* (2013.01); *H04R 2460/13* (2013.01); *H04R 2499/15* (2013.01)

(58) Field of Classification Search
  CPC .......... H04R 2307/207; H04R 2440/07; H04R 2460/13; H04R 2499/15; G10K 9/13
  See application file for complete search history.

(56) References Cited

FOREIGN PATENT DOCUMENTS

| | | |
|---|---|---|
| JP | 58-107799 A | 6/1983 |
| JP | S63042299 A | 2/1988 |
| JP | H07015792 A | 1/1995 |
| JP | 2010-252034 A | 11/2010 |

OTHER PUBLICATIONS

International Search Report and Written Opinion of PCT Application No. PCT/JP2018/039133, dated Dec. 11, 2018, 08 pages of ISRWO.

\* cited by examiner

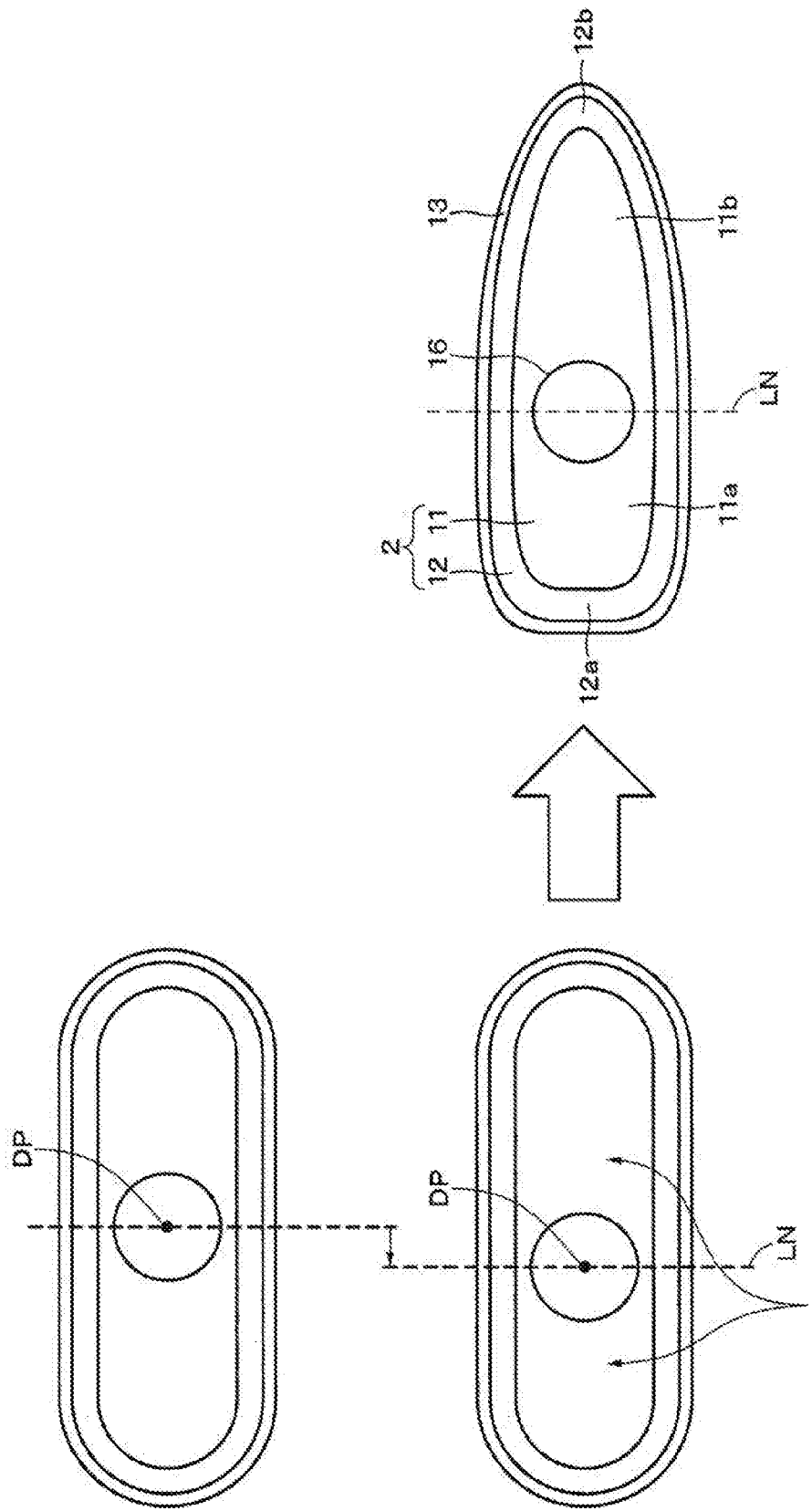

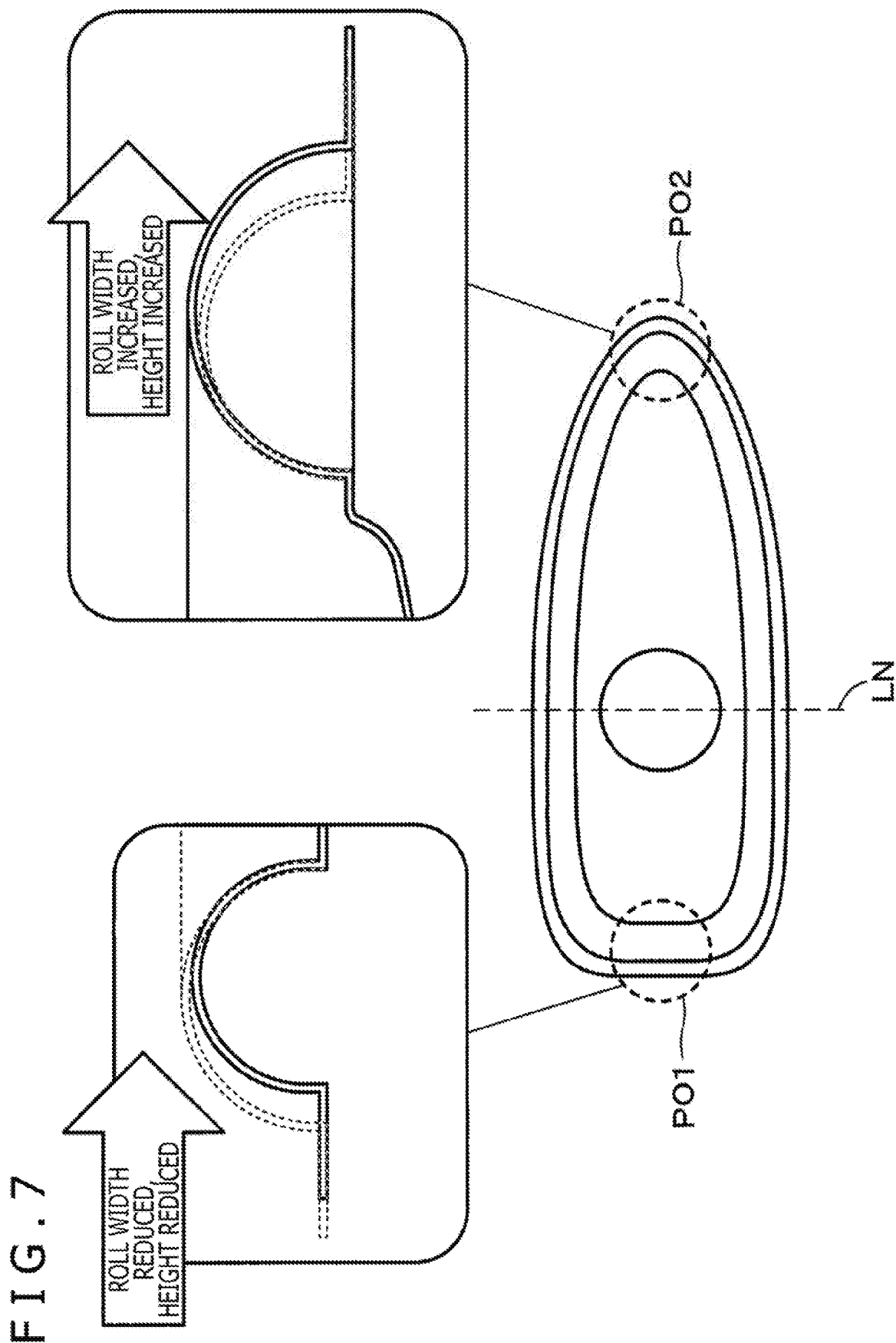

VIBRATION SYSTEM, SPEAKER APPARATUS AND VIDEO DISPLAYING APPARATUS

CROSS REFERENCE TO RELATED APPLICATIONS

This application is a U.S. National Phase of International Patent Application No. PCT/JP2018/039133 filed on Oct. 22, 2018, which claims priority benefit of Japanese Patent Application No. JP 2017-234849 filed in the Japan Patent Office on Dec. 7, 2017. Each of the above-referenced applications is hereby incorporated herein by reference in its entirety.

TECHNICAL FIELD

The present disclosure relates to a vibration system, a speaker apparatus and a video displaying apparatus.

BACKGROUND ART

PTL 1 discloses a speaker apparatus that includes a vibration plate that has a track shape and has a boil coil attachment portion offset (decentered) from the center thereof. It is to be noted that the track shape is such a shape that two sides opposed to each other in a rectangular shape are replaced into a semicircular shape and is a shape similar to that of a track of an athletic stadium. The track shape has a left-right symmetrical shape with respect to a straight line passing the center thereof and extending in a vertical direction.

CITATION LIST

Patent Literature

[PTL 1]
Japanese Patent Laid-Open No. 2010-252034

SUMMARY

Technical Problems

By offsetting the driving point of a track shape from the center of a vibration plate, the vibration mode of the vibration plate is dispersed and smoothing of a sound pressure-frequency characteristic and reduction of distortion are achieved. However, by displacing the driving point, there is a possibility that a phenomenon called rolling may occur in which, the vibration plate may not vibrate with the horizontal position kept and vibrate while inclining in an oblique direction with respect to the horizontal direction. In the case where such rolling occurs, degradation of sound quality, generation of abnormal sound by contact between a bobbin and a magnetic circuit, damage to a part by such contact, and so forth may possibly occur.

Accordingly, it is an object of the present disclosure to provide a vibration system, a speaker apparatus and a video displaying apparatus that prevent occurrence of rolling.

Solution to Problems

The present disclosure is, for example, a vibration system, including:
A vibration system, including:
a vibration plate and an edge portion disposed around the vibration plate, in which
the vibration plate has a first region and a second region that have shapes asymmetrical with each other, and
the vibration plate is configured such that a weight difference between the first region and the second region is equal to or smaller than a threshold value and besides stiffness at the edge portion is substantially uniform.

The present disclosure is, for example, a speaker apparatus, including:
the vibration system according to described above;
a magnetic circuit having a magnetic gap;
a bobbin attached to a boil coil attachment portion provided on the vibration plate; and
a coil wound around the bobbin.

The present disclosure may be a video displaying apparatus that includes the speaker apparatus described above.

Advantageous Effect of Invention

At least with the embodiment of the present disclosure, generation of rolling can be prevented. It is to be noted that the effect described here is not always restrictive and may be any effect described in the present disclosure. Further, contents of the present disclosure shall not be interpreted limitatively by the exemplified effect.

BRIEF DESCRIPTION OF DRAWINGS

FIG. 4 is a view illustrating a configuration of the vibration system according to the embodiment.
FIG. 7 is a view illustrating an example of a configuration for substantial uniformizing the stiffness of an edge portion according to the embodiment.

DESCRIPTION OF EMBODIMENT

In the following, an embodiment of the present disclosure and so forth are described with reference to the drawings. It is to be noted that the description is given in the following order.

<1. Embodiment>
<2. Modification>

The embodiment and so forth described below are a preferred particular example of the present disclosure, and the contents of the present disclosure are not limited to the embodiment and so forth.

1. Embodiment

[Example of Configuration of Speaker Apparatus]

Figure 1:
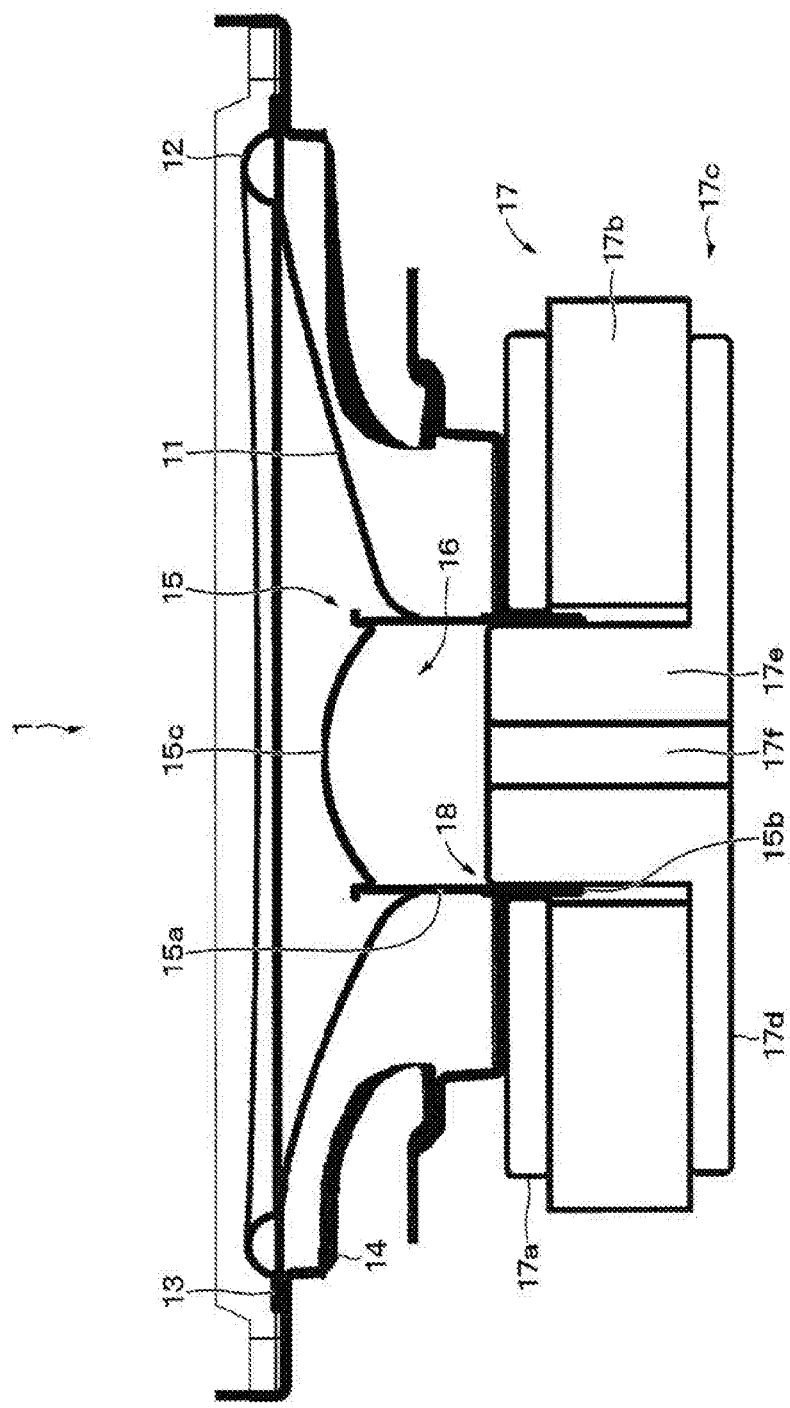
FIG. 1 is a sectional view of a speaker apparatus according to an embodiment.

FIG. 1 is a sectional view of a speaker apparatus (speaker apparatus 1) according to an embodiment of the present disclosure. The speaker apparatus 1 includes a vibration plate 11. An edge portion 12 is provided on a periphery (outer periphery) of the vibration plate 11, and the vibration plate 11 is attached to a frame 14 by a fixing portion 13 disposed along the further outer periphery of the edge portion 12. In the present embodiment, the edge portion 12 has a half roll shape that is convex toward a sound radiation direction. It is to be noted that the edge portion 12 in the present embodiment signifies a location that is deformable together with vibration (motion) of the vibration plate 11.

The speaker apparatus 1 has a voice coil 15. The voice coil 15 includes a bobbin 15a having a cylindrical shape and a coil 15b that is wound on the bobbin 15a and in which a sound current flows. In the present embodiment, a center cap 15c is mounted in the proximity of a tip end of the bobbin 15a. A circular hole portion 16 as a voice coil attachment portion is formed at a predetermined location (for example, a location offset by a predetermined amount from the center) of the vibration plate 11, and a tip end of the bobbin 15a is attached to the hole portion 16.

The speaker apparatus 1 includes a magnetic circuit 17. The magnetic circuit 17 includes a plate 17a, a magnet 17b and a yoke 17c. The plate 17a includes a magnetic material and is formed in a thin annular shape, and is attached to the frame 14. The magnet 17b formed in an annular shape is attached to a rear face of the plate 17a. The yoke 17c is attached to the rear face of the magnet 17b.

The yoke 17c is configured such that a disk-formed base plane portion 17d and a center pole portion 17e forwardly projected from the center of the base plane portion 17d are integrally formed. The center pole portion 17e is formed, for example, in a circular cylindrical shape. It is to be noted that a configuration in which the base plane portion 17d and the center pole portion 17e are provided independently of each other is sometimes applied, and, in this case, a plate corresponding to the base plane portion 17d is called a back plate. A front face of the base plane portion 17d of the yoke 17c is attached to a rear face of the magnet 17b. Further, the speaker apparatus 1 includes an enclosure (not depicted).

The plate 17a, the magnet 17b and the yoke 17c are coupled to each other in a state in which the center axes thereof are aligned with each other. A space between the plate 17a and a center pole 17e is formed as a magnetic gap 18. At least part of the coil 15b is positioned in the magnetic gap 18. It is to be noted that a hole portion 17f is provided as a flow path of air in the center pole portion 17e in the present embodiment, and a backing pressure upon operation of the speaker apparatus 1 is controlled by the hole portion 17f.

[Vibration System]
(Entire Vibration System)

Figure 2:
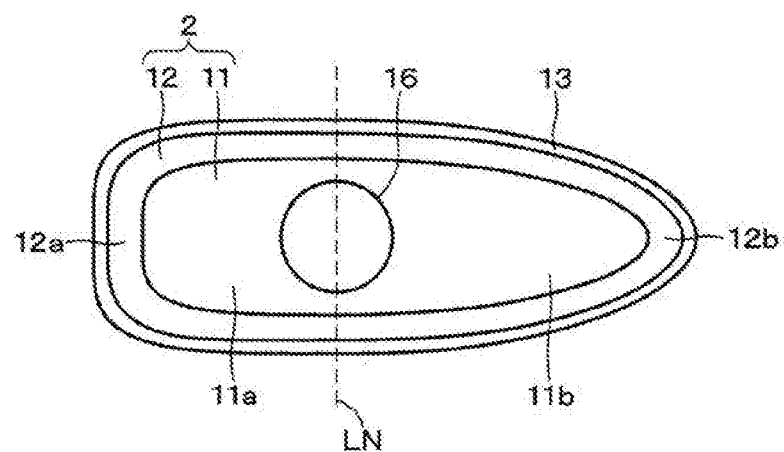
FIG. 2 is view illustrating a configuration of a vibration system according to the embodiment.

Now, a vibration system (vibration system 2) according to the present embodiment is described. As depicted in FIG. 2, from within the configuration of the speaker apparatus 1, the vibration system 2 is configured from the vibration plate 11 and the edge portion 12 included in the speaker apparatus 1. The vibration plate 11 according to the present embodiment generally has a substantially horizontally elongated ellipse shape (such a shape as that of a rowing boat as viewed in plan, also called an oval shape). An outer peripheral edge of the vibration plate 11 may include a straight line or an overall outer peripheral edge may be configured from a curve. Also the shapes of the edge portion 12 and the fixing portion 13 have a shape corresponding to the vibration plate 11.

The vibration plate 11 in the vibration system 2 is divided into a first region 11a and a second region 11b with respect to a virtual division line LN. The first region 11a and the second region 11b are configured such that they have an asymmetrical shape to each other and the weight difference between them is equal to or smaller than a threshold value. A curve configuring an outer edge of the first region 11a and another curve configuring an outer edge of the second region 11b have curvatures different from each other.

Similarly, also the edge portion 12 is divided into a first edge portion 12a disposed around the first region 11a and a second edge portion 12b disposed around the second region 11b with respect to a virtual division line LN.

<Division Line>

Figure 3A:
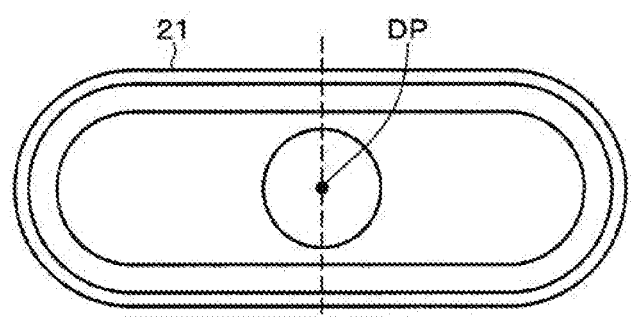
FIGS. 3A and 3B are views illustrating an example of a division line according to the embodiment.
Figure 3B:
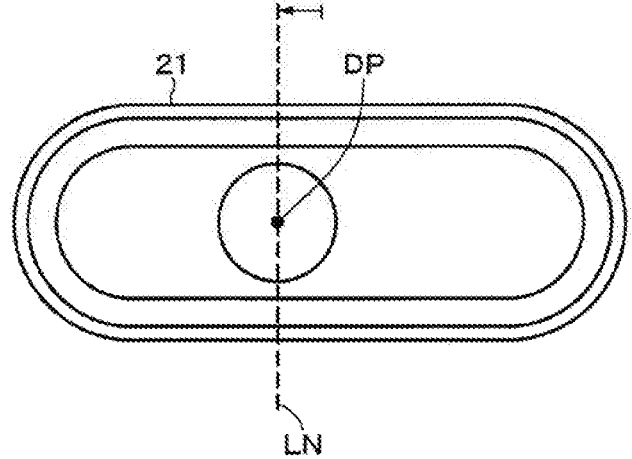

Here, the division line LN is described with reference to FIGS. 3A nd 3B. A basic shape is assumed which is a shape similar to the shape of the vibration plate 11 and left-right symmetrical in the case where it is divided, for example, in a vertical direction at the center thereof. In the case of the present embodiment, a vibration plate 21 having a track shape as depicted in FIG. 3A as a basic shape is assumed. A driving point DP of the vibration plate 21 is offset. It is to be noted that the driving point DP signifies, for example, a middle or a near portion of the voice coil 15, or, in other words, signifies a middle or a near portion of a circular cross section of the bobbin 15a. Thus, a line substantially orthogonal to a direction in which the driving point DP of the vibration plate 21 is offset (horizontal direction (leftward direction) in FIGS. 3A and 3B) and passing the driving point DP is determined as the division line LN in the present embodiment. It is to be noted that the substantially orthogonal signifies that it is an orthogonal state or permits a state in which the line is displaced by some error from the orthogonal to such a degree that the effect of the present embodiment is achieved.

(Adjustment of Weight of Vibration System)

A vibration system 2 according to the present embodiment is further described below. As described above, only if the driving point DP of the vibration plate 21 having a track shape is offset, a weight difference occurs between the regions formed by the division line LN as depicted in FIG. 4. The weight difference causes generation of rolling. Therefore, in the present embodiment, the weight difference is made equal to or smaller than a threshold value (preferably, 0) only by making the shape of the first region 11a and the shape of the second region 11b asymmetrical relative to each other and changing the shape or the thickness, or in other words, without using any other component part such as a spindle. It is to be noted that the phrase "equal to or smaller than a threshold value" may be equal to or smaller than the threshold value or may be smaller than the threshold value.

It is to be noted that the weight difference in the present embodiment is a concept including, in addition to the weight of the first region 11a and the second region 11b, a weight applied from the air to the vibration plate in the respective regions (additional mass of air).

(Adjustment of Stiffness)

On the other hand, the stress balance between the first region 11a and the second region 11b defined by the division line LN may possibly become non-uniform arising from that the position from the driving point DP to the end of the vibration plate becomes non-uniform by offsetting the position of the driving point DP, that a difference appears between the lengths of the edge portions included in the regions and so forth. There is the possibility that the vibration plate 11 is inclined upon operation of the speaker apparatus 1 arising from the non-uniformity of the stress balance.

Figure 5A:
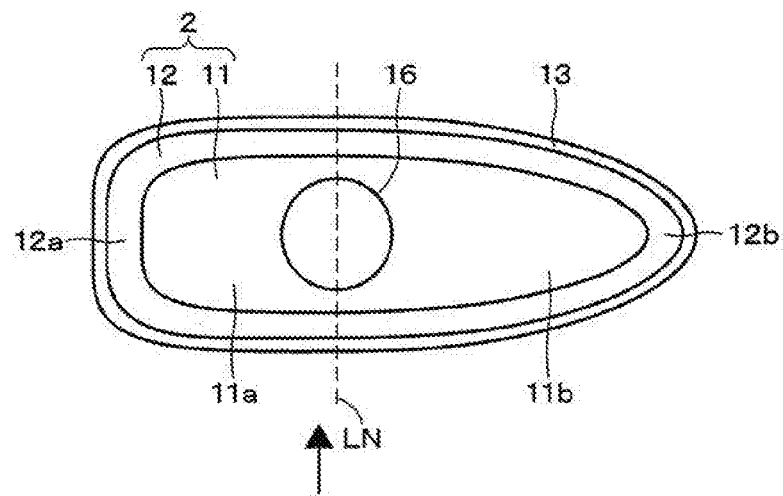
FIGS. 5A and 5B are views illustrating a difference in deformation degree caused by non-uniformity of stress balance.
Figure 5B:
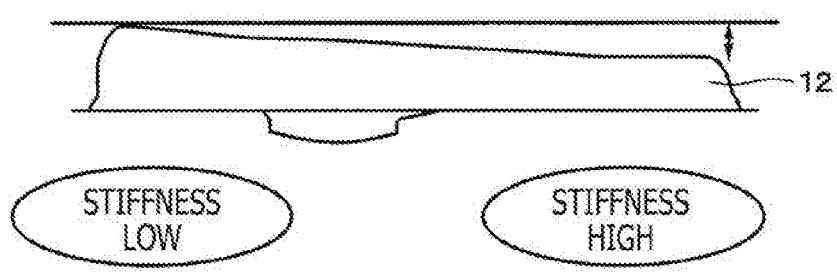

FIG. 5A is a view depicting the vibration plate 11 described above and so forth, and FIG. 5B is a view of the vibration plate 11 and the edge portion 12 as viewed from a side face in the longitudinal direction. FIG. 5B is a view schematically depicting a behavior (motion) of the edge portion 12 in the case where a predetermined input is applied. The predetermined input may be a sound signal or may be force uniformly applied to the vibration plate 11 fixed to a frame 14 by a fixing section 13.

As depicted in FIG. 5B, a location at which the deformation is great and a location at which the deformation is small appear at the edge portion 12 arising from dispersion in the stress balance. In this example, the deformation is greatest in the proximity of a middle of the C-shaped first edge portion 12a, and the deformation is smallest in the proximity of a middle of the second edge portion 12b. In regard to the stiffness (difficulty of deformation), the stiffness on the first edge portion 12a side is low, and the stiffness of the second edge portion 12b side is high. In this manner, some dispersion appears in degree of deformation of the edge portion 12 arising from dispersion of the stress balance, and this gives rise to degradation of the sound quality.

Figure 6:
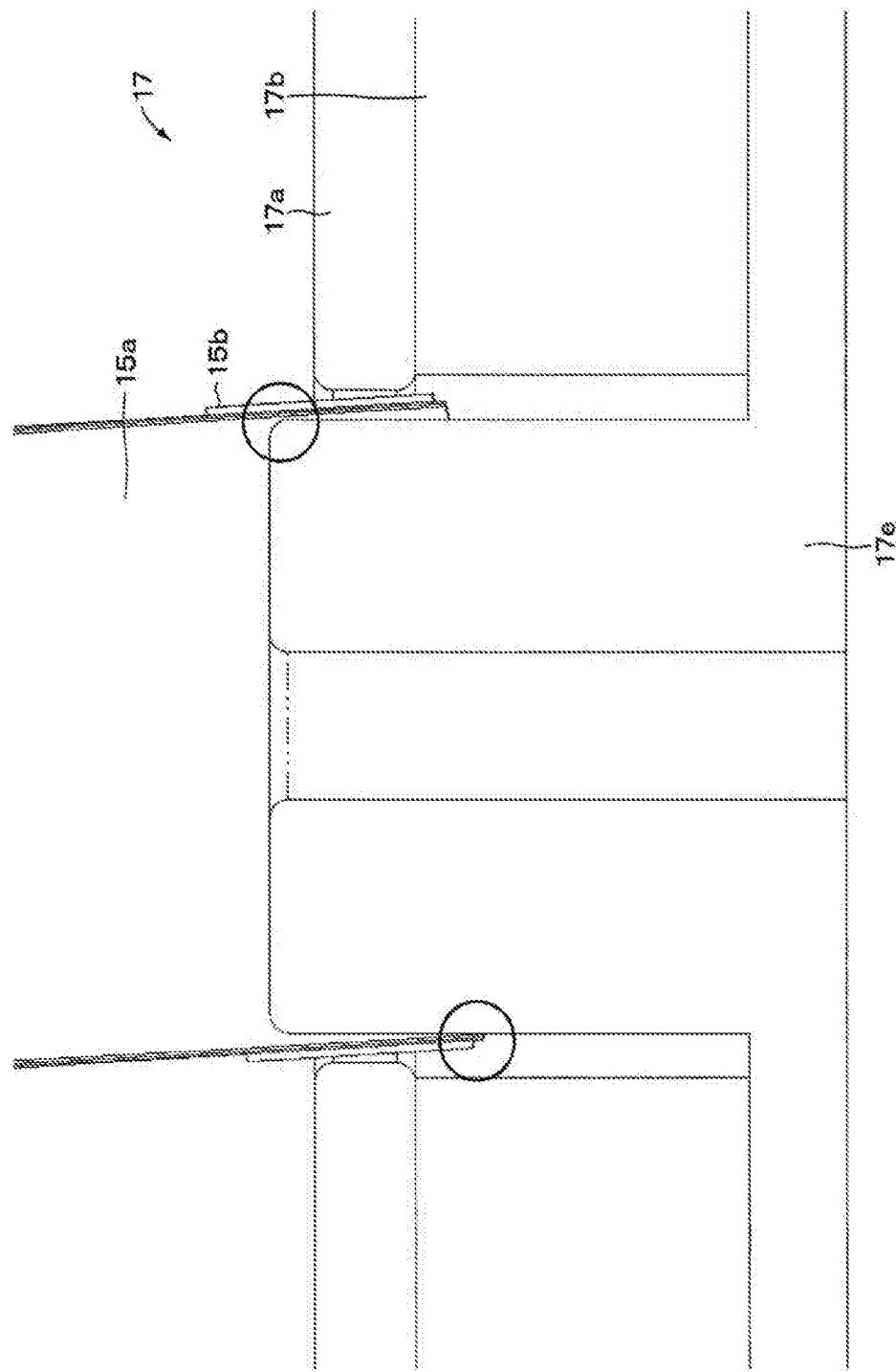
FIG. 6 is a partial enlarged view depicting a state in which a bobbin and a magnetic circuit contact with each other.

Therefore, in the present embodiment, the edge portion 12 is configured such that the stiffness at the edge portion 12 is substantially uniform. That the stiffness is substantially uniform signifies that the vibration plate 11 is configured such that the ratio of a maximum displacement to a minimum displacement of the vibration system 2 when the vibration plate 11 is displaced to a maximum amplitude value with which the speaker apparatus 1 is used is equal to or lower than a threshold value. As the threshold value, 23% is recommendable. If the dispersion of the displacement is equal to or less than 23%, for example, less than 23%, then the bobbin 15a and the magnetic circuit 17 contact with each other as depicted in FIG. 6 (at a location denoted by a round mark), and rolling that may lead to generation of abnormal sound or destruction of a part can be prevented.

An example of a configuration for making the stiffness of the edge portion 12 substantially uniform is described. In the present embodiment, the shape of the edge portion 12 is continuously changed to make the stiffness of the edge portion 12 substantially uniform. More particularly, as depicted in FIG. 7, a first reference position PO1 is set in the proximity of a middle of the first edge portion 12a that is a location at which the deformation is greatest (location at which the stiffness is lowest) in the present embodiment. Further, as depicted in FIG. 7, a second reference position PO2 is set in the proximity of a middle of the second edge portion 12b that is a location at which the deformation is smallest (location at which the stiffness is highest) in the present embodiment.

At the location of the first reference position PO1 in the edge portion 12, since the stiffness is low, it is necessary to suppress the deformation. Therefore, the width (diameter) and the height (radius) of the half roll shape are made small to achieve a less deformable shape. At the location of the second reference position PO2 of the edge portion 12, since the stiffness is high, it is necessary to make the location easily deformable. Therefore, the width (diameter) and the height (radius) of the half roll shape are made great to achieve a deformable shape.

In the present embodiment, the width and the height of the half roll shape are continuously (for example, linearly) increased over a range from the first reference position PO1 to the second reference position PO2. By this configuration, the stiffness of the edge portion 12 can be made substantially uniform.

It is to be noted that, although, in the example described above, the width and the height of the edge portion 12 are changed, this is not restrictive, and the thickness may be changed to make the stiffness of the edge portion 12 substantially uniform. In addition, at least one of the width, height or thickness of the edge portion 12 may be changed to make the stiffness of the edge portion 12 substantially uniform.

[Example of Effect Achieved by the Present Embodiment]

According to the present embodiment, generation of rolling in the vibration system 2 can be prevented.

Figure 8A:
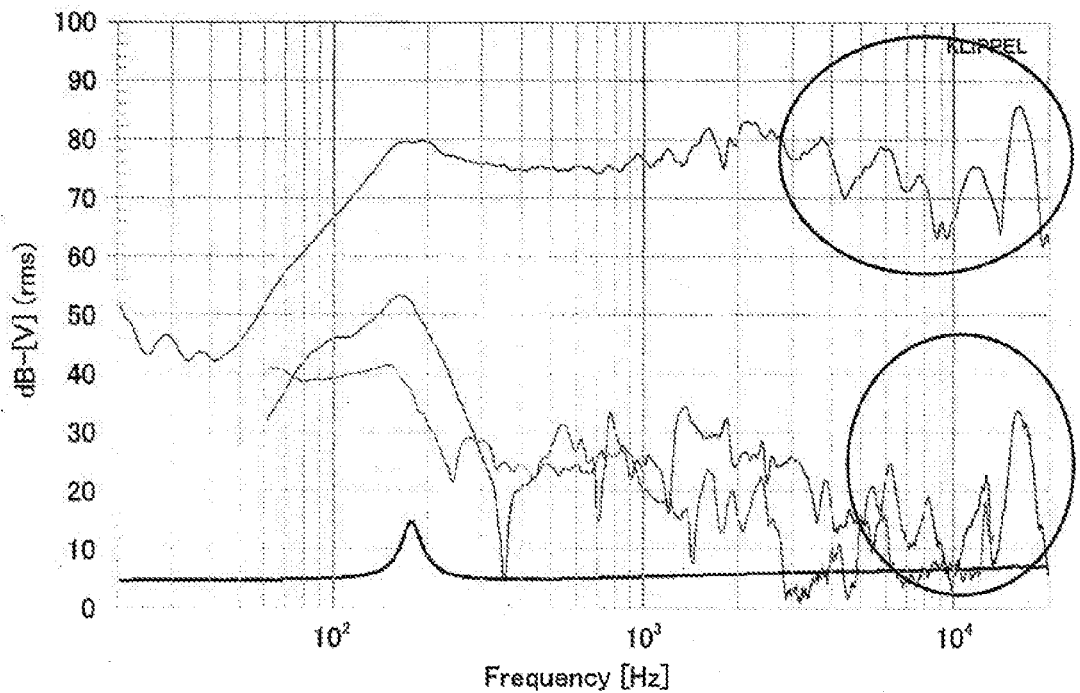
FIG. 8A is a view depicting a sound pressure-frequency characteristic of the speaker apparatus that includes a track-shaped vibration plate.
Figure 8B:
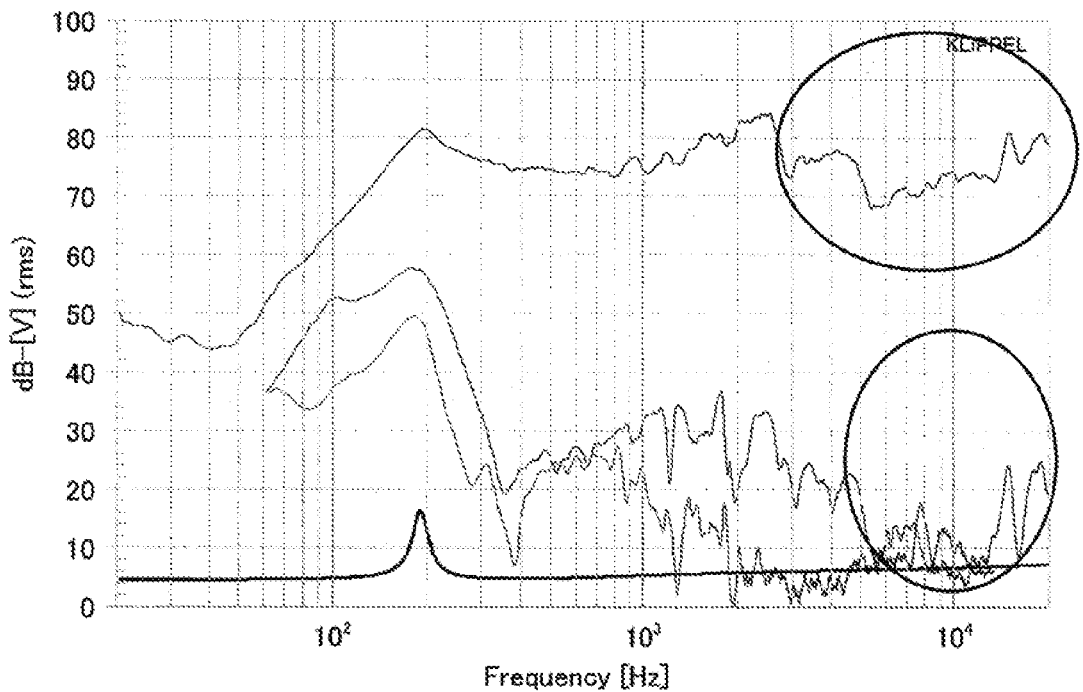
FIG. 8B is a view depicting a sound pressure-frequency characteristic of the speaker apparatus that includes a vibration plate having a shape according to the embodiment.

FIGS. 8A and 8B are views illustrating an example of an effect achieved by the present embodiment. FIG. 8A depicts a sound pressure-frequency characteristic in the case where the vibration plate 11 and the edge portion 12 have a track shape, and FIG. 8B depicts a sound pressure-frequency characteristic in the case where the vibration plate 11 and the edge portion 12 have the shape described in the description of the present embodiment. The axis of abscissa in the graphs of FIGS. 8A and 8B indicates a frequency, and the axis of ordinate indicates a sound pressure level. A black solid line drawn on the upper side in each of FIGS. 8A and 8B indicates a fundamental wave component of the sound pressure-frequency characteristic, and a black solid line drawn on the lower side in each of FIGS. 8A and 8B indicates a second harmonic component (second harmonic) of the sound pressure-frequency characteristic.

As indicated by round marks in FIGS. 8A and 8B, in FIG. 8B, the dispersion of the sound pressure level in a high frequency region is improved (a high frequency region is comparatively flat). Further, the secondary strain characteristics are improved.

APPLICATION EXAMPLE

Figure 9A:
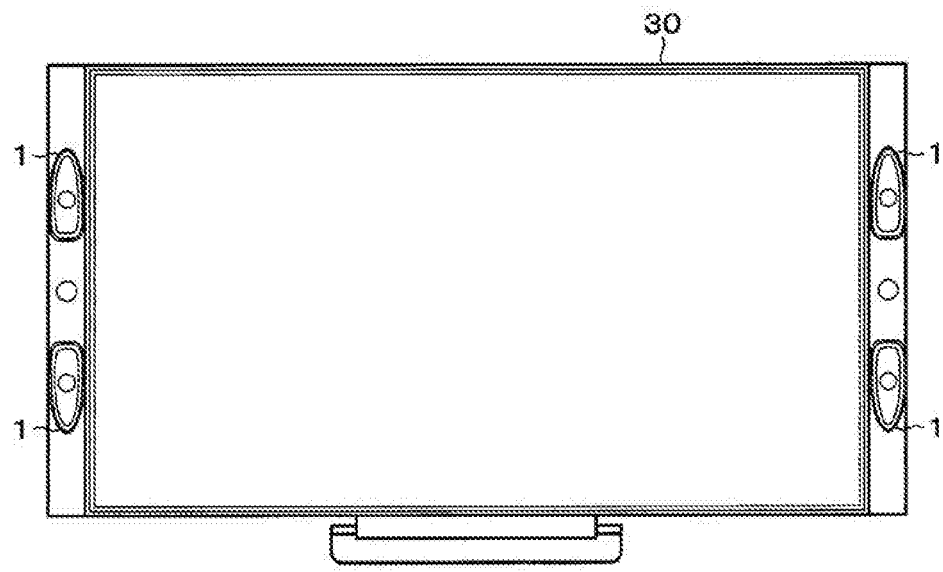
FIGS. 9A, 9B and 9C are views illustrating application examples of the speaker apparatus according to the embodiment.
Figure 9B:
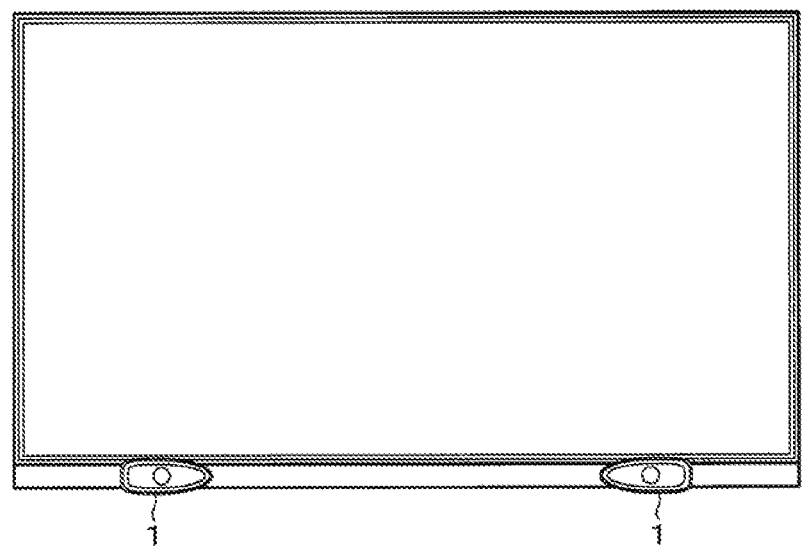
Figure 9C:
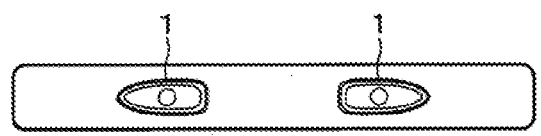

The speaker apparatus 1 according to the present embodiment can be applied to various kinds of equipment. For example, a plurality of the speaker apparatuses 1 may be incorporated in left and right bezels of a television reception apparatus that is one of video displaying apparatuses. In this case, a pair of the speaker apparatuses 1 may be disposed such that the second regions 11b of them are directed in the opposite directions to each other. As an alternative, a pair of the speaker apparatuses 1 may be disposed on a lower side bezel of a television apparatus as depicted in FIG. 9B. As another alternative, a pair of the speaker apparatuses 1 may be disposed on a sound bar as depicted in FIG. 9C.

It is to be noted that, in the case where a pair of the speaker apparatuses 1 are placed sideways, it is preferable for hearing not that they are placed in a same direction but that the sides of the speaker apparatuses 1 having a same shape (the first regions 11a or the second regions 11b) are opposed to each other. Further, in the case where the speaker apparatuses 1 are disposed vertically, it is preferable for hearing that the speaker apparatuses 1 are disposed in a left-right symmetrical relationship with respect to a vertical axis of the television reception apparatus, for example, as depicted in FIG. 9A.

It is to be noted that the video displaying apparatus is not limited to a television apparatus but may be a personal computer, a tablet type computer, a robot apparatus or the like. Further, the speaker apparatus 1 may be mounted on an in-vehicle apparatus, for example, a headrest.

Working Examples

Now, working examples of the present disclosure are described. It is to be noted that the substance of the present disclosure is not limited to the following working examples.

In the present embodiment, the weight of the first region 11*a* and the weight of the second region 11*b* were changed, and the degree of rolling was evaluated separately for two cases including a case in which the shape of the edge portion 12 was changed and another case in which the shape of the edge portion 12 was fixed (the shape was not changed).

The "weight different (%)" was calculated by the (weight (g) of the heavier one of the regions)/(weight (g) of the lighter one of the regions)×100−100.

The "edge shape" is indicated by a ratio between the width (dimension) of the roll at the first reference position PO1 and the width (dimension) of the roll at the second reference position PO2 and was considered between a case in which the shape continuously changes within a range of the ratio in dimension and another case in which the shape does not change.

The "degree of rolling" is defined by a ratio of an increasing amount of a maximum displacement to a minimum displacement when the vibration plate 11 was displaced to a maximum amplitude value with which the speaker apparatus 1 of the vibration plate 11 is used.

For an example (good example) in which the "degree of rolling" is equal to or smaller than 23%, an evaluation of "Good" was made. For an example in which the "degree of rolling" is reduced to one half from the evaluation, namely, for an example (favorable example) in which the "degree of rolling" is equal to or lower than 12%, an evaluation of "Favorable" was made. For an example (unfavorable example) in which the "degree or rolling" is equal to or higher than 23%, an evaluation of "Unfavorable" was made.

The result is indicated in Table 1 below.

TABLE 1

|  | Weight of first region | Weight of second region | Weight difference | Edge shape | Degree of rolling | Evaluation |
| --- | --- | --- | --- | --- | --- | --- |
| Working example 1 | 0.1915356 | 0.1943196 | 1.5% | 25:29 | 8.0% | Favorable |
| Working example 2 | 0.1841628 | 0.19545 | 5.8% | 25:29 | 12.0% | Favorable |
| Working example 3 | 0.218164 | 0.1791 | 17.9% | 25:29 | 16.13% | Good |
| Working example 4 | 0.1696296 | 0.2313744 | 36.4% | 25:29 | 19.40% | Good |
| Example for reference | 0.1903356 | 0.2162904 | 12.0% | Fixed (no change in shape) | 50.6% | Unfavorable |

From the results indicated in Table 1, it is found preferable that the weight difference is equal to or smaller than, for example, 10% (more preferable that the weight difference is equal to or smaller than 6%), and besides the shape of the edge portion 12 is changed. Further, even in the case where the weight difference is equal to or greater than 6%, by changing the shape of the edge portion 12, the degree of rolling can be made equal to or smaller than 23%. Further, even if the weight difference is comparatively small (12.0%), in the case where the shape of the edge portion 12 is not changed, the degree of rolling is high. Therefore, it can be recognized that it is preferable to change the shape of the edge portion 12.

2. Modification

Although the embodiment of the present disclosure has been described particularly, the substance of the present disclosure is not limited to the embodiment described above, and it is possible to make various modifications based on the technical idea of the present disclosure.

Figure 10A:
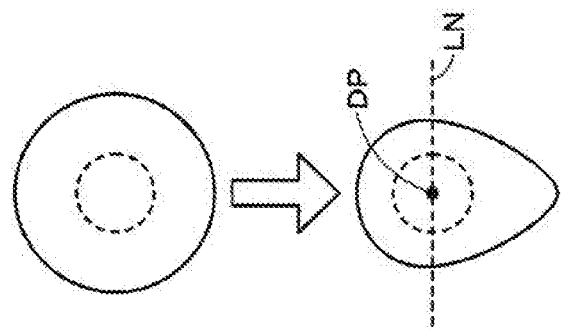
FIGS. 10A, 10B and 10C are views illustrating modifications of the present disclosure.
Figure 10B:
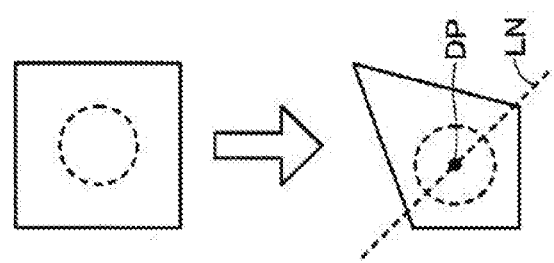
Figure 10C:
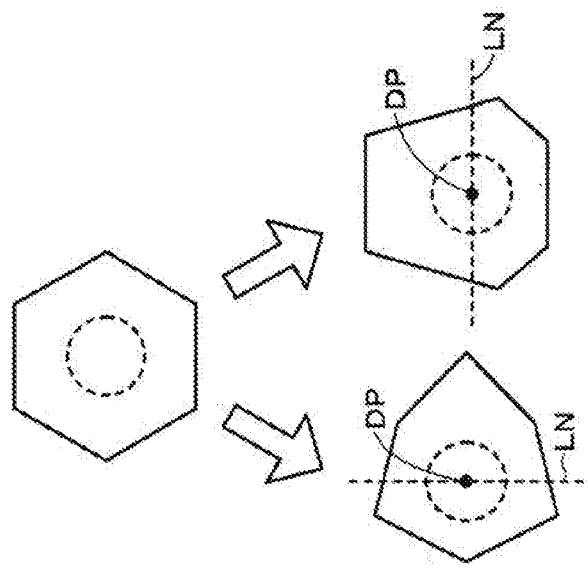

Although the basic shape in the embodiment described above is a track shape, this is not restrictive. For example, the basic shape may be a circular shape as depicted in FIG. 10A or the basic shape may be a rectangular shape as depicted in FIG. 10B, or else the basic shape may be a regular polygonal shape (for example, a square shape or a regular hexagonal shape) as depicted in FIG. 10C. Thus, the vibration plate may be shaped in response to the basic shape such that it has a first region and a second region divided by a division line LN extending substantially orthogonally to a direction in which the driving point DP is offset and passing the driving point DP.

The shape of the edge portion may be a shape other than the half roll shape and may be a shape such as a waveform shape, a recessed roll shape or a flat shape.

The configurations, methods, steps, shapes, materials, numerical values and so forth exemplified in the embodiment described above are examples to the last, and configurations, methods, steps, shapes, materials, numerical values and so forth different from them may be used as occasion demands. The embodiment and the modifications described above can be combined suitably.

The present disclosure can take the following configurations.

(1)

A vibration system, including:

a vibration plate and an edge portion disposed around the vibration plate, in which the vibration plate has a first region and a second region that have shapes asymmetrical with each other, and the vibration plate is configured such that a weight difference between the first region and the second region is equal to or smaller than a threshold value and besides stiffness at the edge portion is substantially uniform.

(2)

The vibration system according to (1), in which the first region and the second region are defined by a division line that is a line substantially orthogonal to a direction in which a driving point of a basic shape that is approximate to a shape of the vibration plate and is a symmetrical shape is offset and passes the driving point of the vibration plate.

(3)

The vibration system according to (1) or (2), in which the vibration system is configured such that a ratio of a maximum displacement to a minimum displacement of the vibration system when the vibration plate is displaced to a maximum amplitude value in response to a predetermined input is equal to or smaller than a threshold value.

(4)

The vibration system according to (3), in which the vibration system is configured such that the ratio of the maximum displacement to the minimum displacement of the vibration system when the vibration plate is displaced to the maximum amplitude value in response to the predetermined input is equal to or smaller than 23%.

(5)

The vibration system according to any one of (1) to (4), in which the weight difference between the first region and the second region is equal to or smaller than 10%.

(6)

The vibration system according to any one of (1) to (5), in which the edge portion has a half roll shape, and at least one of a width, height or thickness of the half roll shape continuously changes from a first edge portion disposed around the first region to a second edge portion disposed around the second region.

(7)

The vibration system according to (6), in which a first reference position is set to a substantially middle position of the first edge portion while a second reference position is set to a substantially middle position of the second edge portion, and at least one of the width, height or thickness of the half roll shape changes so as to increase from the first reference position to the second reference position.

(8)

The vibration system according to (2), in which the basic shape is a track shape or a regular polygonal shape.

(9)

A speaker apparatus, including:
the vibration system according to any one of (1) to (8);
a magnetic circuit having a magnetic gap;
a bobbin attached to a boil coil attachment portion provided on the vibration plate; and
a coil wound around the bobbin.

(10)

A video displaying apparatus, including:
the speaker apparatus according to (9).

REFERENCE SIGNS LIST

1 . . . Speaker apparatus, 2 . . . Vibration system, 11 . . . Vibration plate, 11a . . . First region, 11b . . . Second region, 12 . . . Edge portion, 12a . . . First edge portion, 12b . . . Second edge portion, 15a . . . Bobbin, 15b . . . Coil, 17 . . . Magnetic circuit, DP . . . Driving point, PO1 . . . First reference position, PO2 . . . Second reference position

The invention claimed is:

1. A vibration system, comprising:
a vibration plate and an edge portion around the vibration plate, wherein
the vibration plate has a first region and a second region,
a shape of the first region is asymmetrical with a shape of the second region,
a curvature of a first curve that configures an outer edge of the first region is different from a curvature that configures an outer edge of the second region,
the outer edge of the first region is opposite to the outer edge of the second region with respect to a division line,
the vibration plate is configured such that a weight difference between the first region and the second region is equal to or smaller than a threshold value, and
a stiffness at the edge portion is substantially uniform.

2. The vibration system according to claim 1, wherein
the first region and the second region are defined by the division line that is a line substantially orthogonal to a direction in which a driving point of a basic shape is offset,
the basic shape is approximate to a shape of the vibration plate and is a symmetrical shape, and
the divisional line passes the driving point of the vibration plate.

3. The vibration system according to claim 2, wherein
the basic shape is one of a track shape or a regular polygonal shape.

4. The vibration system according to claim 1, wherein
a ratio of a maximum displacement to a minimum displacement of the vibration system is equal to or smaller than a threshold value when the vibration plate is displaced to a maximum amplitude value in response to a specific input.

5. The vibration system according to claim 4, wherein
the ratio of the maximum displacement to the minimum displacement of the vibration system is equal to or smaller than 23%.

6. The vibration system according to claim 1, wherein
the weight difference between the first region and the second region is equal to or smaller than 10%.

7. The vibration system according to claim 1, wherein
the edge portion has a half roll shape
at least one of a width, height or thickness of the half roll shape continuously changes from a first edge portion to a second edge portion,
the first edge portion is around the first region, and
the second edge portion is around the second region.

8. The vibration system according to claim 7, wherein
a first reference position is set to a substantially middle position of the first edge portion,
a second reference position is set to a substantially middle position of the second edge portion, and
at least one of the width, height or thickness of the half roll shape increases from the first reference position to the second reference position.

9. A speaker apparatus, comprising:
a vibration system that includes:
a vibration plate and an edge portion around the vibration plate, wherein
the vibration plate has a first region and a second region, a shape of the first region is asymmetrical with a shape of the second region, a curvature of a first curve that configures an outer edge of the first region is different from a curvature that configures an outer edge of the second region, the outer edge of the first region is opposite to the outer edge of the second region with respect to a division line, the vibration plate is configured such that a weight difference between the first region and the second region is equal to or smaller than a threshold value, and a stiffness at the edge portion is substantially uniform;

a magnetic circuit having a magnetic gap;

a bobbin attached to a boil coil attachment portion provided on the vibration plate; and a coil wound around the bobbin.

10. A video displaying apparatus, comprising:

a speaker apparatus, wherein the speaker apparatus includes:

a vibration system that includes:

a vibration plate and an edge portion around the vibration plate, wherein the vibration plate has a first region and a second region, a shape of the first region is asymmetrical with a shape of the second region, a curvature of a first curve that configures an outer edge of the first region is different from a curvature that configures an outer edge of the second region.

the outer edge of the first region is opposite to the outer edge of the second region with respect to a division line, the vibration plate is configured such that a weight difference between the first region and the second region is equal to or smaller than a threshold value, and a stiffness at the edge portion is substantially uniform;

a magnetic circuit having a magnetic gap;

a bobbin attached to a boil coil attachment portion provided on the vibration plate; and a coil wound around the bobbin.

* * * * *